Sept. 8, 1959
D. C. HILL
2,903,310
PACKING GLAND FOR A MOVABLE PISTON
Filed Oct. 1, 1958
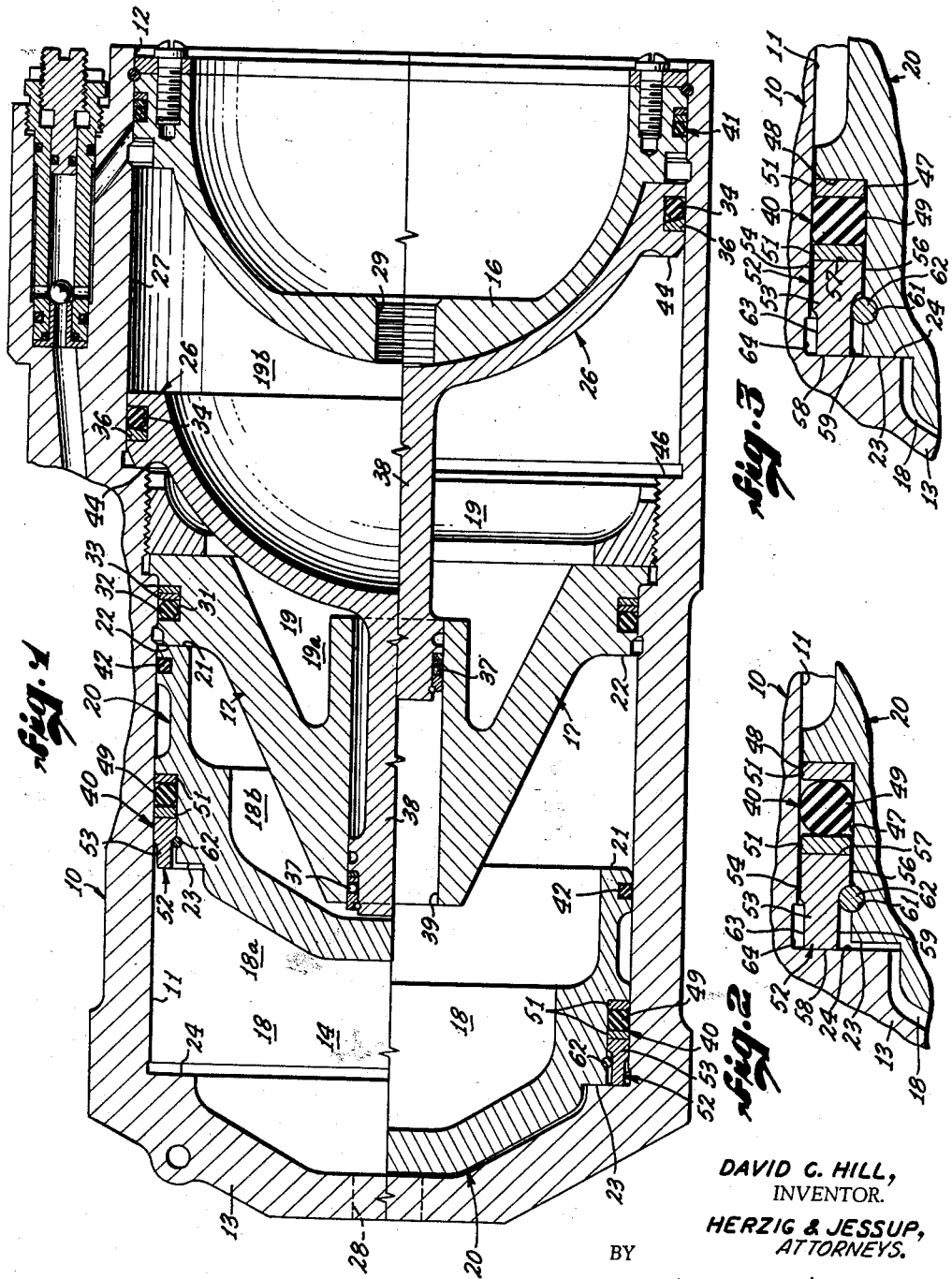
DAVID C. HILL,
INVENTOR.
HERZIG & JESSUP,
BY ATTORNEYS.

United States Patent Office 2,903,310
Patented Sept. 8, 1959

2,903,310

PACKING GLAND FOR A MOVABLE PISTON

David C. Hill, Flintridge, Calif., assignor to Haskel Engineering Associates, Glendale, Calif., a copartnership Application October 1, 1958, Serial No. 764,596

6 Claims. (Cl. 309—23)

This invention relates to a packing gland for a movable piston, and more particularly to a packing gland which effects an increased packing squeeze between a piston and a cylinder to decrease leakage of air, hydraulic fluid or other pressure-transmitting media, which is critical on a unit, such as an accumulator or the like, which is likely to be stored for a long period of time but which must be ready for operation on short notice.

O-ring packings of resilient, pliant material, such as rubber, neoprene or the like, are universally used as packing glands for movable pistons in units such as accumulators, hydraulic cylinders or the like, being highly efficient for sealing the annular space necessarily formed between the periphery of the piston and the inner surface of a cylinder wall, in both low and high pressure hydraulic and pneumatic systems. To obtain the greatest efficiency from an O-ring packing, a groove, formed for retaining the O-ring packing, is necessarily slightly oversize, relative to the O-ring, to avoid buckling and distortion of the O-ring during movement of the piston, which would cause leakage past the O-ring from one side of the piston to the other. A very efficient packing can thus be achieved without necessitating close tolerances in the formation of the groove.

By such construction, although the O-ring is very efficient during movement of the piston and the application of a pressure fluid or gas, there is a substantial leakage past the O-ring packing when a unit is stored under pressure for a long period of time. Such leakage is very critical on a unit which is likely to be stored for a long period of time but which must be ready for operation on short notice, as many of the present day hydraulic systems and accumulators require in modern aircraft and missiles.

As an example, in an accumulator for a hydraulic or pneumatic system, an air pressure is stored in the cylinder and behind a movable piston. When unused, or the hydraulic fluid forwardly of the piston is emptied therefrom, the piston is in a bottomed position within the cylinder, with the end of the piston in abutment with the end wall of the cylinder. Even though it is being stored for a long period of time, it is desirable and imperative in a unit which may necessitate immediate use on short notice that the air pressure behind the piston remain constant and ready for instant use. Leakage of the air system from behind the piston and into other parts of the accumulator may seriously hamper the operation thereof and require a loss of valuable time to purge or repressurize.

It is therefore an object of this invention to increase packing squeeze of a packing gland on a movable piston while it is being stored and the piston is in a bottomed position within its cylinder for decreasing leakage of a gaseous or hydraulic pressure within the cylinder.

It is another object of this invention to provide new and improved means for automatically increasing the packing squeeze of a packing gland on a movable piston when the piston is in a bottomed position and which permits the packing gland to assume a normal packing squeeze during operation of the piston.

A further object of this invention is to provide new and improved means of the character described which does not require critical manufacturing tolerances in the construction thereof, yet which effects an increased packing squeeze, when the piston is bottomed, adequate to decrease inner leakage sufficiently to retain a pressure behind the piston to make the unit instantly operable.

Yet another object of this invention is to provide a new and improved means for retaining the compressing or squeezing means on the piston for travel therewith, and for preventing inadvertent removal therefrom.

Still another object of this invention is to provide a new and improved means for providing an increased packing squeeze of a packing gland on a movable piston, when the piston is bottomed, which is easily and readily assembled, economical to manufacture, and capable of interchangeability of parts thereof.

It is a general object of this invention to provide a new and improved packing gland for a movable piston which overcomes disadvantages of prior means and methods heretofore intended to accomplish generally similar purposes.

These and other objects of this invention will be more apparent from the following drawings, detailed description and appended claims.

In the drawings:

Fig. 1 is a vertical cross-sectional view of a cylinder having therein a packing gland designed and constructed in accordance with this invention, in which a movable piston thereof is shown in two positions, that is, the upper half of the drawing shows the piston in a position wherein a chamber in front of the piston is filled with a fluid under pressure and the lower half of the drawing shows a position of the piston wherein said chamber has been emptied;

Fig. 2 is an enlarged fragmentary cross-sectional view illustrating the state of the packing gland prior to the bottoming of the piston within the cylinder on its forward stroke; and Fig. 3 is an enlarged fragmentary cross-sectional view, similar to Fig. 2, illustrating the state of the packing gland when the end of the piston has bottomed in the cylinder.

Referring more particularly to the drawings, there is shown, by way of illustration but not of limitation, a cylinder, generally designated by the numeral 10, which, in this adaptation, functions as an accumulator having a cylindrical bore 11 having an open end 12 and terminating inwardly at an end wall 13 to form a working chamber 14 closed at the open end, opposite the end wall 13, by an end cap 16. The accumulator 10 further comprises a diaphragm 17 non-movably fixed within the bore 11 intermediate of the end wall 13 and the end cap 16 and dividing the chamber 14 into forward and rearward chambers 18 and 19, respectively.

A movable piston, generally designated by the numeral 20, is slidingly disposed in the bore 11 for axial reciprocating movement in the forward chamber 18, and is adapted to move rearwardly, to the right as viewed in the drawings, as limited by the abutment of a rear face 21 thereof with a forward face 22 of the diaphragm 17, and in its forward movement, to the left as viewed in the figures, by the abutment of a forward face 23 thereof with an inwardly-facing shoulder 24 of the end wall 13.

A piston 26 is slidingly disposed in a counterbore 27 of the bore 11 and is adapted to reciprocate, forwardly and rearwardly, within a chamber 19.

The accumulator 10, as herein described, does not form a part of this invention per se, but is described herein only for the purpose of illustrating the invention as applied thereto.

In the operation of the accumulator 10, the forward chamber 18 is adapted to receive or accumulate hydraulic fluid in the portion 18a of the chamber 18 forwardly of the piston 20, when the hydraulic pressure is built up in a hydraulic system (not shown) having access to the forward portion 18a of the chamber 18 as by a port 28.

A substantially constant pressure of gaseous material such as air or the like is in the portion 18b of the chamber 18, rearwardly of the piston 20, whereby, as the hydraulic system is in operation and hydraulic fluid in the portion of the chamber forwardly of the piston is needed in the system, the air pressure in the rearward portion 18b of the chamber 18 causes the piston 20 to move axially forward (to the left in the drawing) to avoid a pressure drop in the system. To retain a constant pressure in the system hydraulic or pneumatic pressure is admitted as through a port 29 of the end cap 16 into the chamber 19b rearwardly of the sliding piston 26, to move the piston 26 forwardly.

Each element herein described, i.e., the pistons, diaphragm and end cap, provides sealing means, in a conventional manner, to seal one chamber from the other. The diaphragm 17 is provided with a sealing means disposed in a groove 31, the sealing means comprising an annular resilient O-ring packing 32 of rubber, neoprene or the like, and a pair of annular backup rings 33 of a metallic material, to seal off the chamber 18 from the chamber 19. The piston 26 is provided with an annular O-ring packing 34 and an annular backup ring 36 to seal off the chamber 19a from the chamber 19b and an additional O-ring packing 37 of reduced diameter on a reduced 38 disposed within a bore 39 of the diaphragm 17.

The movable piston 20 is provided with a new and improved packing gland 40 designed and constructed in accordance with this invention, to be hereinafter described, for sealing off the chamber 18a from the chamber 18b. The end cap 16 is provided with sealing packing gland 41 similar to the packing glands 32—33 and 34—36 of the diaphragm 17 and piston 26 respectively. An additional O-ring packing 42 is preferably provided in a cylindrical skirt 43 of the movable piston 20 to provide additional sealing of the piston 20 during movement thereof.

The upper portion of Fig. 1 illustrates the position of the movable pistons 20 and 26 when the chamber 18a, forward of the piston 20, is filled with an hydraulic fluid, the rearward face 21 of the piston 20 being in abutment with the forward face 22 of the diaphragm 17; the piston 26 being in a forward position and having a face 44 thereof in abutment with a rearwardly facing shoulder 46 formed by the counterbore 27 defining the chamber 19b. The lower portion of Fig. 1 illustrates the position of the pistons 20 and 26 in their corresponding positions when the chamber 18a, forwardly of the piston 20, has been emptied of hydraulic fluid, that likewise being the position of the piston 20 when the accumulator 10 is being stored for instant use.

In the position of the piston 20 shown in the lower portion of Fig. 1 and in the enlarged cross-sectional view of Fig. 3, wherein the unit 10 is being stored, it is desirable and necessary, in order to be instantly operable, that there is no leakage past the packing gland 40. In order to prevent such leakage, the packing gland 40 provides means for compressing an O-ring packing thereof in an axial direction whereby the resilient material of the O-ring is expanded radially, relative to the axis of the piston, to form an appreciably tighter than normal seal between the piston and the inner surface of the cylinder 10.

As best seen in Figs. 2 and 3, the packing land 40 is slideably disposed on the forward end of the piston 20 for axial movement thereon. The piston 20 is circumferentially relieved as at 47, adjacent the forward face thereof, forming an annular shoulder 48 spaced rearwardly of the forward face 23. An annular O-ring packing 49, of resilient, pliable material such as rubber, neoprene or the like, having an inner diameter substantially equal to the outer peripheral surface of a circumferentially relieved portion 47 and an outer surface substantially equal to the inner diameter of the chamber 18, is disposed on the recess 47, adjacent the shoulder 48, and sandwiched between a pair of annular backup rings 51. Each backup ring 51 preferably has inner and outer diameters having a sliding fit with the outer diametrical surface of the recess 47 and the inner diametrical surface of the chamber 18, respectively, to enclose the O-ring packing 49 during axial movement of the piston 20.

An annular compressing means 52 is slidingly disposed on the recess 47 for axial movement thereon, the compressing means comprising an annular ring 53 having an outer surface 54 slightly smaller than the inner diametrical surface of the chamber 18 and an inner diameter 56 slightly larger than the outer surface of the recess 47, a rearward face 57 adapted to engage the forward face of the forward backup ring 51 and a forward face 58. The length of the sealing means 52 is of such dimension that when the O-ring packing 49 is in an uncompressed state, as illustrated in Fig. 2, the face 58 of the sleeve 52 extends forwardly of the face 23 of the piston 20, whereby as clearly illustrated in this figure, as the piston 20 approaches the end wall 13 of the cylinder 10, the face 58 of the sleeve 53 is brought into abutment with the face 24 of the end wall 13 prior to the engagement of the face 23 of the piston 20 with the surface 24 of the wall 13.

During continued forward movement of the piston 20 to its extreme bottomed position, illustrated in Fig. 3, wherein the face 23 of the piston 20 is in abutment with the face 24 of the wall 13, the sleeve 53 is axially displaced rearwardly, thereby compressing the O-ring packing 49, substantially as shown in the figure. In this compressed state, the O-ring packing 49 more tightly seals the chamber 18a from the chamber 18b to prevent leakage between the chambers, thus retaining pressures within the chambers 18a—18b which are adequate for immediate operation of the hydraulic system when so required.

Retaining means are preferably provided to retain the packing gland 40 on the piston 20. The retaining means comprises an internally annularly relieved counterbore 59 adjacent the forward face 58 of the sleeve 53 and an annular groove 61 on the outer surface of the recess 47 in which a split ring 62 resides.

To install the packing gland 40 on the piston 20, the backup rings 51 and the sleeve 53 are slipped on the recess 47 and pushed rearwardly against the shoulder 48 until the forward face 58 of the sleeve 53 clears the groove 61 of the piston 20. The snap ring 62 is then snapped over the recess 47 and into the groove 61. The sleeve 53 and the forward backup ring 51 are then slid forwardly to bring the counterbore 59 of the sleeve 53 over the split ring 62, after which the O-ring 49 is expanded sufficiently to slip over the backup ring 51 and drop into place between the forward and rearward backup rings 51. The O-ring 49 biases the forward backup ring 51 and the sleeve 53 forwardly to keep the split ring 62 covered by the wall of the counterbore 59 of the sleeve 53. The diametrical dimension of the counterbore 59 is preferable such as to provide a sliding fit with the outer diameter of the split ring 62 with insufficient clearance between the inner surface of the counterbore 59 and the outer surface of the split ring 62 for the split ring 62 to be thereafter removed from the groove 61 until the O-ring 49 is removed from its sandwiched position on the recess 47. After the piston 20 is installed within the bore 11, the O-ring 49 can no longer be removed or compressed sufficiently for the forward face 58 of the sleeve 53 to clear the groove 61, thus the sleeve 53 is securely retained on the recess 47. The sleeve 53 is preferably relieved at its forward end, as indicated at 63, to clear the bottom corner of the bore 11, and the bore 11 is preferably relieved as at 64, thereby avoiding interference of the sleeve at the corner of the bore and providing a positive flat engagement of the face 58 with the face 24 of the end wall 13.

Whereas an accumulator has been herein described to exemplify the instant invention, a packing gland for a movable piston, it is to be understood that the instant packing gland may be adapted for use in any unit, having a movable piston, wherein it is desired to prevent leakage of either hydraulic or pneumatic pressure, or both, to store the unit for instant use.

While I have herein shown and described what I conceive to be the most desired embodiments of my invention, it is to be understood that alterations and modifications thereof may be made in a manner to satisfy the spirit of my invention which is intended to comprehend any and all equivalent devices as comprehended in the following claims.

What I desire to secure by Letters Patent is:

1. A packing gland for a movable piston adapted to reciprocate in a bore of a cylinder having an end wall, comprising: means defining a circumferentially relieved recess on said piston, substantially coaxial to the axis of said piston and adjacent the forward and thereof; an annular forwardly facing shoulder on said piston, annular resilient sealing means on said recess and adjacent said shoulder; and annular pressure means being arranged to engage said end wall and to slide rearwardly on said recess for distorting said sealing means when said forward end of said piston moves into abutment with said end wall of said cylinder.

2. A packing gland in accordance with claim 1, including: a pair of annular rings on said recess, one of said rings being interposed between said annular pressure means and said sealing means, the other of said rings being interposed between said sealing means and said shoulder, each of said rings having an inner diameter having a sliding fit with the outer diametrical dimension of said recess and an outer diameter having a sliding fit with the inner surface of said cylinder bore.

3. A packing gland in accordance with claim 2, including: annular retaining means operatively associated with said annular pressure means and said piston for retaining said pressure means on said recess.

4. A packing gland for a movable piston adapted to reciprocate in a bore of a cylinder having an end wall, comprising: means defining a circumferentially relieved recess on said piston, substantially coaxial to the axis of said piston and adjacent a forward end thereof; an annular shoulder on said piston and substantially perpendicular to said circumferential recess; annular resilient sealing means on said recess and adjacent said shoulder; and movable annular pressure means on said recess and having an inner diametrical surface having a sliding fit thereon, a forward end extending forwardly of said forward end of said piston in a retracted position of said piston and a rearward end adjacent said sealing means, whereby said forward end of said annular end of said pressure means is adapted to abut said end wall of said cylinder prior to abutment of said forward end of said piston with said end wall, after which continued movement of said piston end to abut said end wall is translated into a rearward axial movement of said pressure means for distorting said sealing means between said pressure means and said annular shoulder of said piston.

5. A packing gland in accordance with claim 4 wherein: said movable annular pressure means includes an enlarged inner annular surface at said forward end thereof and a shoulder spaced rearwardly of said forward end thereof; and including: means defining a groove on said recess of said piston and spaced rearwardly of said forward end thereof; split ring means in said groove and having an outer diameter substantially greater than the outer surface of said recess and slightly smaller than the inner surface of said enlarged annular surface of said pressure means and adapted to abut said shoulder thereof for retaining said pressure means against removal thereof from said piston.

6. A packing gland in accordance with claim 5 including: a pair of annular ring means on said recess, one of said ring means residing forward of said sealing means and between said sealing means and said pressure means, the other of said ring means residing rearward of said sealing means and between said sealing means and said shoulder of said piston, and each of said ring means having an outer diameter having a sliding fit with the inner diameter of said cylinder.

No references cited.